Oct. 27, 1959  J. H. BLANKENBUEHLER  2,910,640
METHOD AND APPARATUS FOR WELDING
Filed Feb. 27, 1956  2 Sheets-Sheet 1
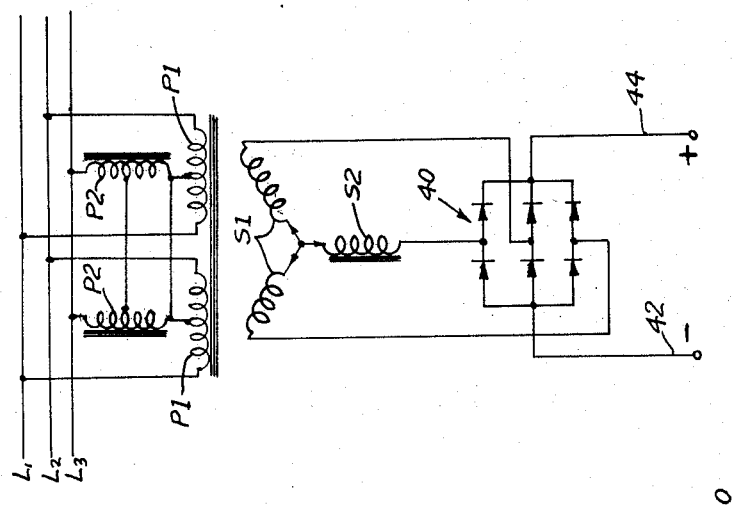
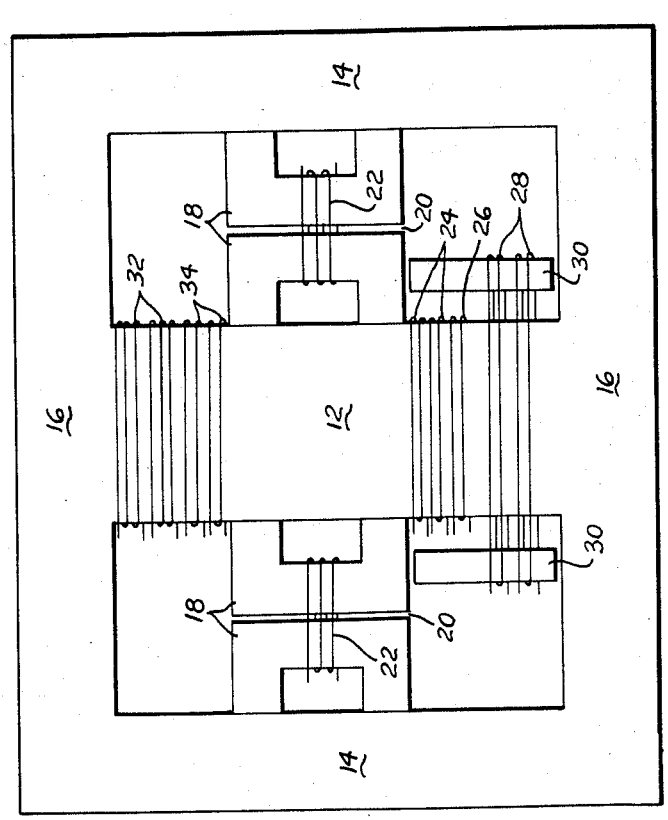
INVENTOR.
JOHN H. BLANKENBUEHLER
BY Toulmin & Toulmin
ATTORNEYS

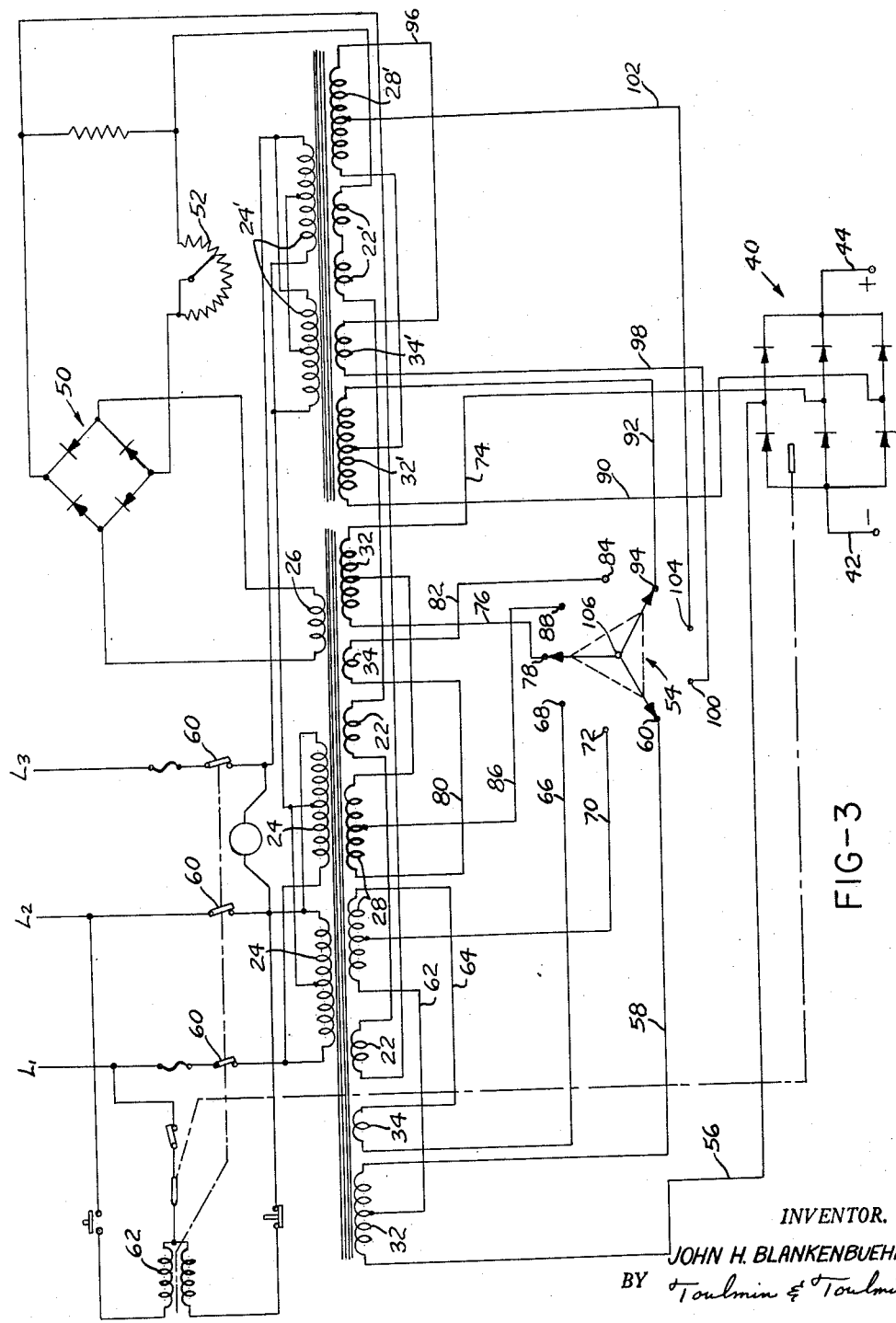

United States Patent Office 2,910,640
Patented Oct. 27, 1959

2,910,640

METHOD AND APPARATUS FOR WELDING

John H. Blankenbuehler, Troy, Ohio, assignor to The Hobart Brothers Company, Troy, Ohio, a corporation of Ohio Application February 27, 1956, Serial No. 567,941

3 Claims. (Cl. 321—8)

This invention relates to a welding apparatus, and particularly to alternating current welding transformers arranged in combination with rectifier means to provide for direct current output.

In a co-pending application, in the names of Edward A. Hobart, William R. Schober, and John H. Blankenbuehler, Serial No. 400,038, filed December 23, 1953, now Patent No. 2,802,981, a single-phase welding transformer is shown characterized in an arrangement for effecting control of the welding current via a saturable reactor means associated with the transformer core.

In a subsequent co-pending application, also in the names of the same inventors referred to above, Serial No. 466,622, filed November 3, 1954, there is shown a still further advance in the art of constructing and operating alternating current welding transformers having associated therewith saturable reactor means, either integral with the transformer core or in the form of a separate unit in circuit with the transformer secondary.

The instant application shows the use of three single-phase transformers so that the primaries of the transformers can be connected to a three-phase supply line, thus distributing the load over the several phases and obtaining more balanced conditions, and thus more efficient loading of the power lines.

While the use of three single-phase transformers in this manner is an advantage in distributing the load over the several phases of the supply line, the use of three complete transformers involves considerable expense and considerable material is required which, in most instances, is not necessary to prevent overloading of the transformers since transformers of this nature are usually operated on an intermittent cycle.

The present invention has as its particular object the provision of a transformer arrangement in which the several phases of the power supply line is substantially uniformly loaded, but wherein only two welding transformers are required.

A further object of the present invention is the provision of a pair of welding transformers connected together in a T arrangement whereby a substantially balanced load is placed on a three-phase supply line with a substantially balanced three-phase secondary supply being delivered to a rectifier for conversion to direct current.

A particular object of the present invention is the provision of a large capacity welding transformer in which a minimum amount of material is employed.

A still further object of the present invention is the provision of an improved switching arrangement for use in connection with alternating current welding transformers which is considerably simpler than what has been used heretofore, thus making the construction and maintenance of the transformer a simple matter.

It is also an object of the present invention to provide a pair of substantially standard transformers connected together in a T arrangement to provide for a three-phase power supply and three-phase secondary so that there is inherent ease of replacement of parts due to the standard construction.

These and other objects and advantages of this invention will become more apparent upon reference to the following specification taken in connection with the accompanying drawings, wherein:

Figure 1 is a diagrammatic view of a single-phase transformer constructed according to this invention;

Figure 2 is a diagrammatic representation of the manner in which two transformers substantially as shown in Figure 1 are interconnected; and Figure 3 is a more complete diagrammatic representation of the transformer arrangement showing the several coils of the transformer and the switching arrangement by means of which the range of the transformer is adjusted.

Referring to Figure 1, the transformer illustrated comprises a shell-type core indicated at 10 consisting of a center leg 12 and side legs 14 and interconnecting end members 16 forming a closed magnetic path.

Arranged between center leg 12 and each of the side legs 14 are the C-shaped members 18 which form leakage reactance paths. These members have the ends of their horizontal legs abutting the legs 14 and their vertical back legs are spaced apart to define the air gaps 20.

Direct current control coils 22 are disposed about the parallel back legs of the C-shaped members 18 and are energizable for carrying the degree of saturation of the horizontal legs of the C-shaped members, thereby to vary the reluctance of the paths established thereby between the legs 12 and 14. It will be noted that coils 22 are disposed substantially out of the path of any alternating current flux, and can thus quite readily be controlled by a supply of direct current thereto and no high voltages will be induced therein making the control difficult.

It will also be noted that all of the magnetic paths pertaining to coils 22 are closed thereby making magnetization thereof easy and thus making efficient use of the energy supply to the control coils.

Arranged about leg 12 of the transformer core are two primary coils 24 with a secondary coil 26 closely coupled therewith. On the same side of the C-shaped members 18 as the primary coils 24 are also located the two secondary coils 28 which extend about the minor leakage members 30 that establish fixed leakage reactance paths which provide a predetermined drooping characteristic to the secondary voltage curve of the transformer that is desirable for welding operations, as is well known in the art.

Wound about leg 12, on the opposite side of C-shaped members 18 from primary coils 24 and thus more loosely coupled therewith than secondary coils 28, are the pairs of secondary coils 32 and 34. These coils are particularly influenced as to their coupling with the primary coils 24 by the degree of saturation of the variable reactance leakage path members 18.

The diagrammatic circuit representation in Figure 2 shows the manner in which two transformers, substantially of the nature described above, can be connected in circuit to a three-phase power supply line and supply a three-phase secondary current to a rectifier bank so that the loading of the power supply line and the rectifier is substantially uniformly distributed.

In Figure 2 the primary coils of one transformer are shown at P1 and the primary coils of the second transformer, referred to as the "teaser" transformer, are marked P2. It will be noted that these coils are connected in T so that a substantially distributed load is imposed on the three-phase power supply lines indicated at L1, L2 and L3. It will also be noted that a greater voltage stands across coils P1 than across coils P2, and the transformer pertaining to coils P1 is thus larger than the transformer pertaining to coils P2.

The secondary coils of the main transformer, of which coils P1 are the primary, are indicated at S1, and the secondary coils of the second transformer, of which the primaries are P2, are indicated at S2. It will be noted that the secondary coils are also connected in T so that a three-phase secondary supply is delivered to the three-phase rectifier bridge generally indicated at 40, whence direct current is supplied to the lines 42 and 44 which forms the welding circuit.

The actual circuit connections of the two transformers, and a novel tri-pole switching arrangement associated wtih the secondary circuit of the transformers, is illustrated in Figure 3.

In Figure 3 power lines L1, L2 and L3 lead in through the blades 60 of a switch, having control coil means 62, to the primary coils 24 of the main transformer, and which coils correspond to coils P1 of Figure 2 and also to the primary coils 24' of the teaser transformer, which coils 24' correspond to the primary coils P2 in Figure 2.

The secondary coils S1 of the main transformer, as illustrated in Figure 2, consist of the several secondary coils referred to in Figure 1 by reference numerals 28, 32 and 34 and are identified by these same reference numerals in Figure 3.

The main transformer also has the additional secondary coil 26 which is connected, as shown in Figure 3, to the four-wave rectifier bridge 50 and control rheostat 52, and with the several direct current control coils 22 of the main transformer and 22' of the teaser transformer.

The several secondary coils of the teaser transformer are indicated at 28', 32', and 34' and correspond to the correspondingly numbered secondary coils associated with the main transformer, except that, according to the present invention, a novel connection is made of the secondaries of the transformers by means of a tri-pole switch 54 which is movable into its several positions for changing the range of the transformer.

With reference to the connection of the secondaries, the left end of the lefthand one of the secondary coils 32 of the main transformer is connected by the wire 56 with one input terminal of rectifier bridge 40 while the righthand end of the said secondary coil is connected by wire 58 to terminal 60 of switch 54.

A tap is taken from between the ends of the said coil 32 by wire 62 to the left end of the lefthand one of the secondary coils 28 of the main transformer, the righthand end of which coil is connected by wire 64 with the righthand end of the lefthand one of coils 34, the opposite end of which is connected by wire 66 with terminal 68 of switch 54.

A tap is taken from the last-mentioned secondary coil 28 via wire 70 to terminal 72 of switch 54.

The righthand end of the righthand one of secondary coils 32 of the main transformer is connected by wire 74 with another input terminal of rectifier bridge 40, while the lefthand end of the coil is connected by wire 76 to terminal 78 of switch 54.

A tap is taken from the said secondary coil 32 to the right end of the righthand one of secondary coils 28 of the main transformer, the lefthand end of which is connected by wire 80 with the lefthand end of the righthand one of secondary coils 34, the opposite end of which is connected by wire 82 with terminal 84 of switch 54.

A tap is taken from the last-mentioned secondary coil 28 and is connected by wire 86 with terminal 88 of switch 54.

Turning now to the teaser transformer, the lefthand end of secondary coil 32' thereof is connected by wire 90 with the third input terminal of rectifier bridge 40, while the righthand end of the secondary coil is connected by wire 92 with terminal 94 of switch 54.

A tap is taken from secondary coil 32 to the left end of secondary coil 28', the righthand end of which is connected by wire 96 with the righthand end of coil 34', the left end of which is connected by wire 98 with terminal 100 of switch 54.

A tap is taken from secondary coil 28' and is connected by wire 102 with terminal 104 of switch 54.

Switch 54 comprises a three-legged rotary switch member 106 which has three positions, and in which positions the following connections are made between the terminals of switch 54:

In its first position the terminals 60, 78 and 94 are interconnected. In this position of switch 54 secondary coil 32' of the teaser transformer is effective, and secondary coils 32 at the left end of the main transformer also are effective; the secondary coils 28, 28', 34 and 34' being ineffective.

In its second position switch 54 interconnects terminals 72, 88 and 104, and in this position of the switch the left end portions of the lefthand secondary coils 28 and 32 and the right end portions of the righthand secondary coils 28 and 32, all of the main transformer, and the left end portions of secondary coils 28' and 32' of the teaser transformer are effective, while the other portions thereof, together with secondary coils 34 and 34', are ineffective.

In its third position switch 54 interconnects terminals 68, 84 and 100 thereof, and in this position of the switch one portion of secondary coil 32', secondary coil 28', and secondary coil 34' are effective. In connection with the main transformer there is similarly made effective one portion of each of secondary coils 32, and the secondary coils 28 and 34 also being made effective.

This provides for three ranges into which the transformer can be adjusted, and in any of the said ranges the energization of the control coils 22 and 22' can be varied by adjusting the rheostat 52, thereby to vary the coupling between the primary coils of the transformers and the secondary coils thereof, particularly the coupling between the said primaries and the secondary coils 32 and 34 of the main transformer and secondary coils 32' and 34' of the teaser transformer.

It will be apparent that the combination of the range changing switch 54 and the adjustable leakage reactance paths provides for substantially complete coverage of the welding range up to the limit of the capacity of the transformers and secondary rectifier bridge. The primary load is substantially uniformly distributed over the three supply phases and the rectifier bridge and the secondary side is substantially uniformly loaded.

The secondary coils of the two transformers can be so arranged that any desired number of turns can be provided in each unit of the secondary coils, and the secondary coils can be distributed in any preferred manner so that at all times the closely-coupled and loosely-coupled secondary coils are available for being connected in circuit.

It will be understood that this invention is susceptible to modification in order to adapt it to different usages and conditions, and accordingly it is desired to comprehend such modifications within this invention as may fall within the scope of the appended claims.

I claim:

1. In a welding transformer, a pair of transformer core means each comprising a closed magnetic core and each core having primary and main secondary windings thereon in spaced relation, a pair of parallel leakage path means associated with each said transformer cores in shunting relation to said main secondary windings adapted for carrying a portion of the main flux of the transformer, each said leakage path means including an air gap whereby the leakage path means are relatively ineffective when the transformer is under no load but become increasingly effective as the load on the transformer increases, electromagnetic control means extending between said parallel leakage paths energizable for varying the degree of saturation of said leakage path means and located so that substantially none of the alternating flux of the transformer core means passes therethrough, means comprising an auxiliary secondary on one of said transformer core means and a rectifier in series therewith for supplying direct current to said electromagnetic control means, said auxiliary secondary being located on the same side of said leakage path means as the primary winding of the pertaining transformer, the primaries of said transformer core means being connected in T for being energized from a three-phase power supply line, the said secondary windings also being connected in T, and a three-phase rectifier bank connected with the terminals of the secondary windings for converting the output current of said transformer to direct current.

2. In a welding transformer, a pair of transformer core means each comprising a closed magnetic core and each core having primary and main secondary windings thereon in spaced relation, a pair of parallel leakage path means associated with each said transformer cores in shunting relation to said main secondary windings adapted for carrying a portion of the main flux of the transformer, each said leakage path means are relatively ineffective when the transformer is under no load but become increasingly effective as the load on the transformer increases, electromagnetic control means extending between said parallel leakage paths energizable for varying the degree of saturation of said leakage path means and located so that substantially none of the alternating flux of the transformer core means passes therethrough, means comprising an auxiliary secondary on one of said transformer core means and a rectifier in series therewith for supplying direct current to said electromagnetic control means, said auxiliary secondary being located on the same side of said leakage path means as the primary winding of the pertaining transformer, the primaries of said transformer core means being connected in T for being energized from a three-phase power supply line, the said secondary windings also being connected in T, and a three-phase rectifier bank connected with the terminals of the secondary windings for converting the output current of said transformer to direct current, there being switch means connecting said secondary windings in T and movable for varying the number of turns of the said secondary windings which are effective.

3. In a welding transformer, a pair of transformer core means each comprising a closed magnetic core and each core having primary and main secondary windings thereon in spaced relation, a pair of parallel leakage path means associated with each said transformer cores in shunting relation to said main secondary windings adapted for carrying a portion of the main flux of the transformer, each said leakage path means are relatively ineffective when the transformer is under no load but become increasingly effective as the load on the transformer increases, electromagnetic control means extending between said parallel leakage paths energizable for varying the degree of saturation of said leakage path means and located so that substantially none of the alternating flux of the transformer core means passes therethrough, means comprising an auxiliary secondary on one of said transformer core means and a rectifier in series therewith for supplying direct current to said electromagnetic control means, said auxiliary secondary being located on the same side of said leakage path means as the primary winding of the pertaining transformer, the primaries of said transformer core means being connected in T for being energized from a three-phase power supply line, the said secondary windings also being connected in T, and a three-phase rectifier bank connected with the terminals of the secondary windings for converting the output current of said transformer to direct current, a three-pole switch having a plurality of terminals connected with points distributed along the secondary windings of said transformers, said switch comprising a single three-pole movable element for bridging the terminals of said switch in sets of three for connecting the secondary windings of the transformers in T with different numbers of turns of the said secondary windings being effective for each position of the movable element of the switch.

References Cited in the file of this patent

UNITED STATES PATENTS

| | | |
|---|---|---|
| 1,839,148 | Greene | Dec. 29, 1931 |
| 2,209,948 | Harmer | Aug. 6, 1940 |
| 2,725,520 | Woodworth | Nov. 29, 1955 |
| 2,765,119 | Marvin | Oct. 2, 1956 |

FOREIGN PATENTS

| | | |
|---|---|---|
| 418,638 | Great Britain | Oct. 29, 1934 |